July 1, 1930.　　　R. F. BACON　　　1,769,819
RECOVERY OF SULPHUR FROM SULPHIDES
Filed June 2, 1927
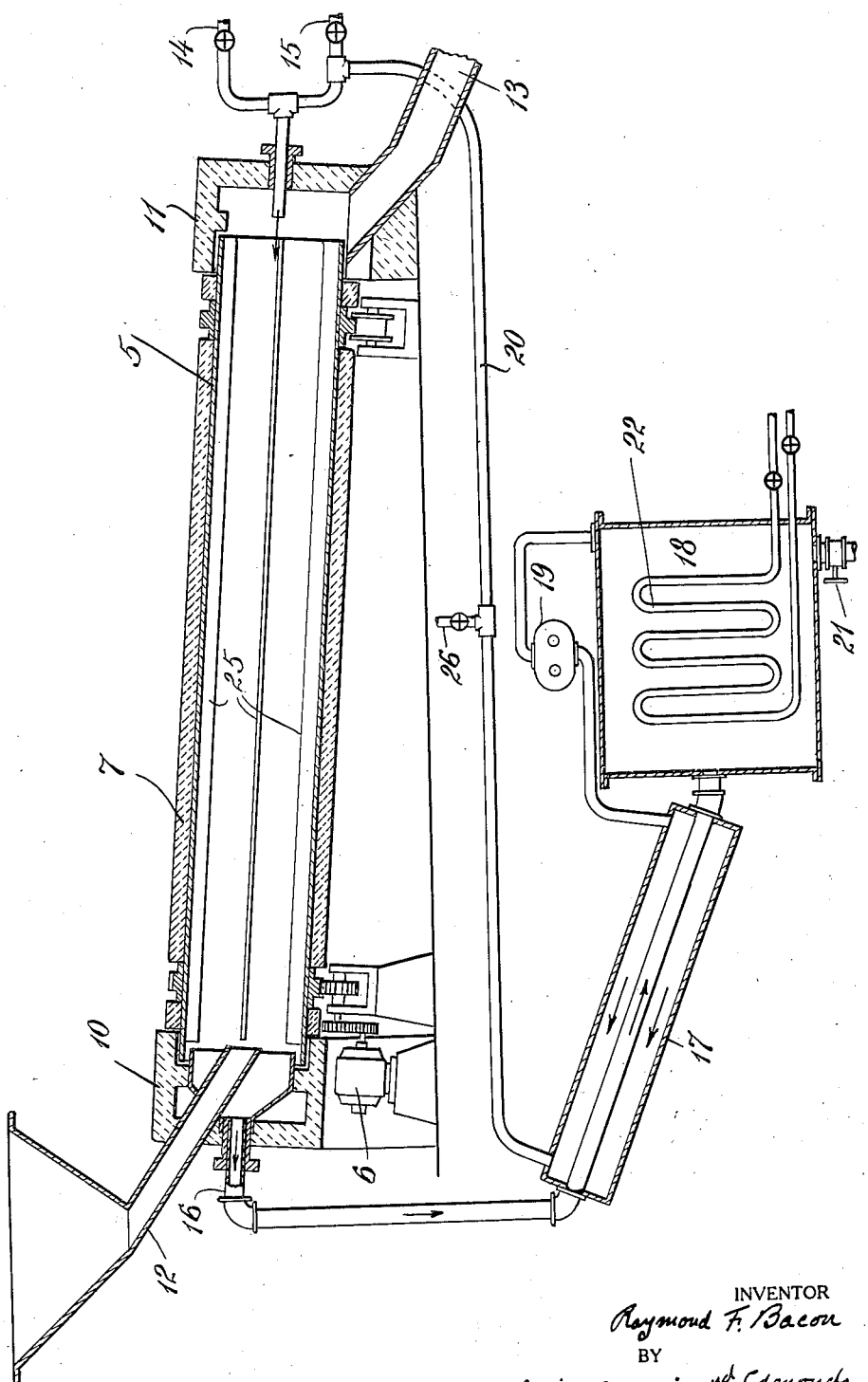
INVENTOR
Raymond F. Bacon
BY
Pennie, Davis, Marvin and Edmonds
ATTORNEY Patented July 1, 1930

1,769,819

UNITED STATES PATENT OFFICE

RAYMOND F. BACON, OF BRONXVILLE, NEW YORK

RECOVERY OF SULPHUR FROM SULPHIDES

Application filed June 2, 1927. Serial No. 195,962.

This invention relates to the recovery of sulphur from sulphides and has for its object the provision of an improved method of recovering sulphur in elemental form from sulphides. More particularly the invention aims to provide an improved method of recovering sulphur in elemental form sulphide ores such as iron pyrites by alternating the action of an oxygen containing gas on the iron pyrites with the action of steam on the thus heated pyrites.

It is known that if air or an oxygen enriched air is mixed with iron pyrites, which have previously been heated to a sufficiently high temperature, that the heat of reaction in the formation of sulphur dioxide and iron oxide will be sufficiently high so that the reaction will continue without the application of further external heat. During this reaction there is enough heat formed so that the reaction may be carried out continuously in a properly designed apparatus without preheating any but the first batch of iron pyrites.

The heat formed in the burning of iron pyrites is directly proportioned to the oxygen in the air which is supporting the combustion. So that the quantity of excess heat generated may be very accurately controlled by controlling the quantity of oxygen in the oxidizing gas along with careful selection of the proper type of retort in which to carry out the combustion reaction.

It is also known that steam will react with iron pyrites at elevated temperatures forming elemental sulphur and hydrogen sulphide as products of the reaction. This reaction normally takes place at temperatures of from 400° to 700° C. and it is customary to externally heat the reaction retort so that the proper temperature may be maintained and the reaction may proceed without interruption.

I have discovered that, starting with a heated sulphide, by suitably alternating the oxidation process, with the steam reaction that both reactions may be carried on without further application of external heat. Elemental sulphur may be recovered from the gaseous products of the reactions.

In the practice of the invention, starting with iron pyrites which has previously been heated to a sufficiently high temperature, the pyrites is permitted to react with oxygen containing gas until part of the sulphur has been released from the pyrites and changed to sulphur dioxide. This reaction is very vigorous and as a consequence the temperature of the mass of material in the furnace or retort is raised to a temperature between 400° and 700° C. At this point the supply of oxygen containing gas is cut off and steam is admitted to the furnace. The steam reacts with the heated pyrites to form hydrogen sulphide and elemental sulphur as end products.

During the steaming stage of the reaction the temperature in the retort gradually declines. When the temperature has fallen to a point where it is affecting the rate of reaction, the steam supply is cut off and the supply of oxygen containing gas is readmitted. This cycle is repeated continuously, raising the temperature in one stage and lowering it in the other stage, the alternating stages being comparable, as far as the generation and utilization of heat is concerned, to industrial methods of making water gas from coal or coke.

In carrying out the invention the gases and vapors of the steaming process may be circulated much as in a cyclic operation. Some of the steam, gases and vapors are consumed by the chemical reactions taking place in the retort. Theoretically, most of the steam should be consumed in this way, but practically there is always some excess steam which may be carried in closed circuit as well as other vapors and gases.

The reactions in the retort are comparatively complicated. The net result of all the inter-reactions is that the gases leaving the retort and entering the condenser carry largely elemental sulphur, steam, sulphur dioxide and hydrogen sulphide. At the temperature of the retort, steam reacts with pyrites to form hydrogen sulphide, sulphur and oxides of iron. The oxygenated gas combines with the various iron sulphides to form sulphur dioxide. These main reactions quite evidently lead to many side reactions, as for instance, some of the sulphur dioxide may react with some of the hydrogen sulphide forming water vapor and elemental sulphur. Some of the sulphur dioxide may combine with mono-sulphide of iron to form elemental sulphur. Just how the products of these various reactions inter-react is difficult to say, and it is doubtful if any definite reaction continues for long, but each or any takes place when conditions for that or those particular reactions are propitious. The net result of these reactions is the formation of elemental sulphur which is collected in a condenser located outside of the retort and not returned to the process.

While the invention is of special advantage in the treatment of iron pyrites, it is also applicable to the recovery of sulphur from other iron and other metal sulphides. Thus, natural iron sulphides of the type of pyrrhotite, or zinc blende, and the like, may be employed in the practice of the invention. The invention is thus applicable to any metal sulphide whose sulphur content can be in whole or in part removed by reaction with steam at elevated temperatures and whose sulphur content will react readily with oxygen at elevated temperatures. Throughout this specification and the appended claims, I have used iron pyrites as typical and representative of such metal sulphides and with the intention of including and covering all such metal sulphides, as well as ores, concentrates or other products containing the same.

Various forms of apparatus are available for the practice of the invention. In the accompanying drawing I have illustrated an apparatus satisfactory for the purpose.

The apparatus illustrated in the drawing comprises an inclined, cylindrical retort 5 rotatably mounted and operatively connected to a driving motor 6. The retort may be made of any appropriate material adapted to withstand such corrosive influences as result from the reactions taking place between the pyrites and the reaction agencies. Iron-nickel-chromium alloys or silica brick linings are suitable for the purpose. The retort may be insulated to conserve heat in any suitable manner as for instance by the layer 7 of magnesium asbestos mixture. The upper or charging end of the retort extends into a stationary housing 10 and the lower or discharging end extends into a similar housing 11. A feeding hopper with a cooperating spout 12 is associated with the housing 10 and is adapted to feed the pyrites into the revolving retort. A residue discharge spout 13 is associated with the housing 11 and is adapted to remove the residues discharging from the retort. Appropriate sealing agencies may be provided in conjunction with the housings and associated spouts. Air or oxygenated air, is introduced into the retort 5 from a valved supply pipe 14. Steam is introduced into the retort 5 from the valved supply pipe 15. The gaseous products of the reactions between the pyrites and the steam or the pyrites and the oxidizing gas are withdrawn from the retort 5 through an outlet pipe 16 communicating with a heat interchanger 17 and discharging into a condenser 18. The temperature within the condenser may be maintained well above the boiling point of water (100° C.) so that no steam is condensed to water. The exhaust gases from the condenser during the steaming stage of the reaction may be forced by a pump 19 into the heat interchanger 17 and thence through the pipe 20 back into the retort 5. The exhaust gases entering the condenser during the oxidizing stage of the process may be withdrawn through a valved pipe 26, or a similar opening in the condenser, for further treatment.

The condenser 18 has a valved discharge pipe 21 through which the accumulated molten sulphur is withdrawn. The condenser is provided with a coil 22 through which an appropriate cooling fluid may be circulated for the control of the condensation.

The operation of the apparatus will be understood from the foregoing description. The retort 5 is preferably provided with longitudinal blades 25 which in the rotation of the retort pick up the pyrites and shower the same through the atmosphere of steam or oxidizing gas filling the retort, thereby securing intimate contact between the pyrites and the reacting agencies. The operation is substantially continuous and the steam and withdrawn vapors may circulate through the system in a cyclic manner with little or no condensation of water. It will be understood that the valves in the pipes 14 and 15 and 26 are alternately opened and closed so that while oxidizing gas is passing into the retort 5 through the line 14 there will be very little steam within the retort 5. The only steam in the retort 5 at this period will be derived from small quantities of heated gases returning to the system through the pipe 20. Though this may be cut off if advisable for the better working of the process. The return of all steam to the process may be eliminated in all stages if desired. This may be accomplished either by suitable valves or a control of the condensation temperature.

When the material in the retort 5 has attained a sufficiently high temperature the valves in the pipes 14 and 26 are closed and the steam valve in the pipe 15 opened, thus allowing the steam to come in contact with the highly heated material in the retort 5. The steam is permitted to react with the material in the retort until the reacting materials have cooled sufficiently so that the reaction between the steam and the materials in the retort has slowed down appreciably. At this time the valve in the pipe 15 is closed and the valves in pipes 14 and 26 are opened. This cycle of reactions may be maintained indefinitely.

I claim:

1. The method of recovering sulphur from iron pyrites which comprises, subjecting the iron pyrites alternately to the action of oxygenated air and steam thereby forming a gaseous product containing elemental sulphur, condensing sulphur from the gases and returning the exhaust condenser gases to the process.

2. The method of recovering sulphur from iron pyrites which comprises, subjecting the iron pyrites alternately to the action of oxygenated air and steam thereby forming a gaseous product containing elemental sulphur, condensing sulphur from the gases without substantial condensation of the steam in the gases and utilizing the exhaust gases of the condensation operation in the further treatment of iron pyrites.

3. The method of recovering sulphur from iron pyrites which comprises, subjecting the iron pyrites alternately to the action of ogygenated air and steam thereby forming a gaseous product containing elemental sulphur, condensing sulphur from the gases, utilizing the exhaust gases of the condensation operation and returning the exhaust condenser gases to the process.

4. The method of recovering sulphur from iron pyrites which comprises subjecting the iron pyrites alternately to the action of ogygenated air and steam thereby forming a gaseous product containing elemental sulphur, condensing sulphur from the gases, and utilizing the exhaust gases of the condensation operation in the further treatment of iron pyrites.

5. The method of recovering sulphur from iron pyrites which comprises, intermittently heating the iron pyrites to a temperature of from 400° to 700° C. by reacting thereon with ogygenated air, reacting on the heated pyrites with steam and condensing elemental sulphur from the exhaust gases.

6. The method of recovering sulphur from iron pyrites which comprises, intermittently heating the iron pyrites to a temperature of from 400° to 700° C. by reacting thereon with oxygenated air, thereby forming a gaseous product, returning the gaseous product to the process, reacting on the heated pyrites and the gaseous product with steam and condensing elemental sulphur from the exhaust gases.

7. The method of recovering sulphur from iron pyrites which comprises, intermittently heating the iron pyrites to a temperature of from 400° to 700° C. by reacting thereon with oxygenated air, thereby forming a gaseous product, returning the gaseous product to the process, reacting on the heated pyrites and the gaseous product with steam, condensing elemental sulphur from the exhaust gases and returning the exhaust condenser gases to the process.

8. The method of recovering sulphur from iron pyrites which comprises, intermittently heating the iron pyrites to a temperature of from 400° to 700° C. by reacting thereon with oxygenated air, thereby forming a gaseous product, returning the gaseous product to the process, reacting on the heated pyrites and the gaseous product with steam, condensing elemental sulphur from the exhaust gases, and returning part of the exhaust condenser gases to the process.

In testimony whereof I affix my signature.

RAYMOND F. BACON.